United States Patent [19]

Hayashi

[11] Patent Number: 5,051,945
[45] Date of Patent: Sep. 24, 1991

[54] SPECIAL FUNCTION UNIT WITH INTERRUPT LATCHES FOR PROGRAMMABLE CONTROLLER

[75] Inventor: Takehiko Hayashi, Aichi, Japan

[73] Assignee: Mitsubishi Denki K.K., Tokyo, Japan

[21] Appl. No.: 330,321

[22] Filed: Mar. 29, 1989

[30] Foreign Application Priority Data

Mar. 29, 1988 [JP] Japan .................................. 63-75042

[51] Int. Cl.⁵ .............................................. G06F 9/00
[52] U.S. Cl. ................................ 364/900; 364/942.3; 364/949; 364/140
[58] Field of Search ... 364/200 MS File, 900 MS File, 364/141, 140

[56] References Cited

U.S. PATENT DOCUMENTS

| | | | |
|---|---|---|---|
| 3,651,484 | 3/1972 | Smeallie | 364/200 |
| 3,771,146 | 11/1973 | Cotton et al. | 364/200 |
| 4,004,283 | 1/1977 | Bennett et al. | 364/200 |
| 4,309,754 | 1/1982 | Dinwiddie, Jr. | 364/200 |

Primary Examiner—Eddie P. Chan
Attorney, Agent, or Firm—Sughrue, Mion, Zinn Macpeak & Seas

[57] ABSTRACT

In a special function unit which controls external equipment according to an output signal of a programmable controller, flip-flop circuits latch the output signals of the programmable controller, an OR circuit provides interruption inputs according to the output signals thus latched, an input circuit discriminates the output signals thus latched, and a microprocessor, according to the interruption input and the output of the input circuit, carries out an interruption process to control the external equipment. At the end of the interuption process, the microprocessor resets the flip-flop circuits which have latched the output signals, with the result that the special function unit can quickly respond to instructions from the programmable controller and can start the processing operation uniformly.

5 Claims, 3 Drawing Sheets

SPECIAL FUNCTION UNIT WITH INTERRUPT LATCHES FOR PROGRAMMABLE CONTROLLER

BACKGROUND OF THE INVENTION

This invention relates to a special function unit for a programmable controller which can respond quickly to the output signal of the programmable controller (hereinafter referred to merely as "a PC", when applicable).

In order to develop a PC initially provided for on-off control into one which is essential for factory automation (FA), a variety of units such as an A/D (analog-to-digital) conversion unit, D/A (digital-to-analog) unit, PID unit and positioning unit have been developed for instrumentation control. These units are referred to as "special function units". They are operated in response to output signals of a PC, to control external equipment.

FIG. 3 shows the arrangement of a programmable controller and a conventional special function unit. As shown in FIG. 3, a PC body 1 comprises a microprocessor 1a; a control memory 1b; an input/output interface 1c; a peripheral unit interface 1d. The input/output interface 1c is connected to a special function unit 2, an input unit 3, and an output unit 4. The special function unit 2 comprises a microprocessor 2a; a control memory 2b; a PC interface 2c; an external unit interface 2d; a common memory 2e which is used also by the PC 1. The external unit interface 2d is connected to an external unit 5.

The operation of the circuit thus organized will be described. The microprocessor 1a of the PC 1 applies an instruction through the input/output interface to the common memory 2e in the special function unit 2. The microprocessor 2a monitors data applied to the common memory 2e while periodically sampling it. When the instruction thus applied is detected by the microprocessor 2a, the external device 5 is controlled through the external unit interface 2d according to the instruction thus detected. The control memory 2b is provided to control the microprocessor 2a.

The conventional programmable controller special function unit being designed as described above, the time interval which elapses from the time instant that the PC 1 applies the instruction to the special function unit 2 until the external unit 5 starts is relatively long. Furthermore, since the microprocessor in the special function unit periodically samples the data applied to the common memory as was described above, the processing time is fluctuated. Therefore, it is difficult for the special function unit to make control in synchronization with other units. In the conventional system, for instance, when the PC outputs an instruction of the order of several microseconds ($\mu$sec), the fluctuation with an accuracy of several tens of milliseconds (msec) occurs with the special function unit. Therefore, for instance, in the case where two positioning unit control two servo motors, respectively, it is difficult to start the latter in synchronization with each other.

SUMMARY OF THE INVENTION

Accordingly, an object of this invention is to eliminate the above-described difficulty accompanying a conventional special function unit for a programmable controller.

More specifically, an object of this invention is to provide a special function unit for a programmable controller which quickly responds to an instruction from the programmable controller, and in which the period of time which elapses from the time instant the programmable controller applies an instruction to the special function unit until the latter starts control is uniform.

The foregoing object and other object of the invention have been achieved by the provision of a special function unit for a programmable controller which controls external equipment according to the output signal of the programmable controller, which, according to the invention, comprises: a plurality of latch means for latching the output signals of the programmable controller; interruption input means for providing interruption inputs according to the output signals thus latched; an input circuit for discriminating the output signals thus latched; an output circuit for resetting the latch means which have latched the output signals; and a microprocessor which, according to the interruption input and the output of said input circuit, carries out an interruption process to control the external equipment through an external equipment interface, and at the end of the interruption process, applies a reset control signal to the latch means which have latched the output signal.

In the special function unit of the invention, the output signals of the programmable controller are processed as interruptions to it, so that the time interval which elapses from the reception of a signal until control of the external equipment starts is greatly reduced; that is, its response speed is high. Therefore, synchronization of such units can be readily achieved.

The nature, principle and utility of the invention will becomes more apparent from the following detailed description when read in conjunction with the accompanying drawings.

BRIEF DESCRIPTION OF THE INVENTION

DESCRIPTION OF THE PREFERRED EMBODIMENTS

One preferred embodiment of this invention will be described with reference to the accompanying drawings in detail.

Figure 1:
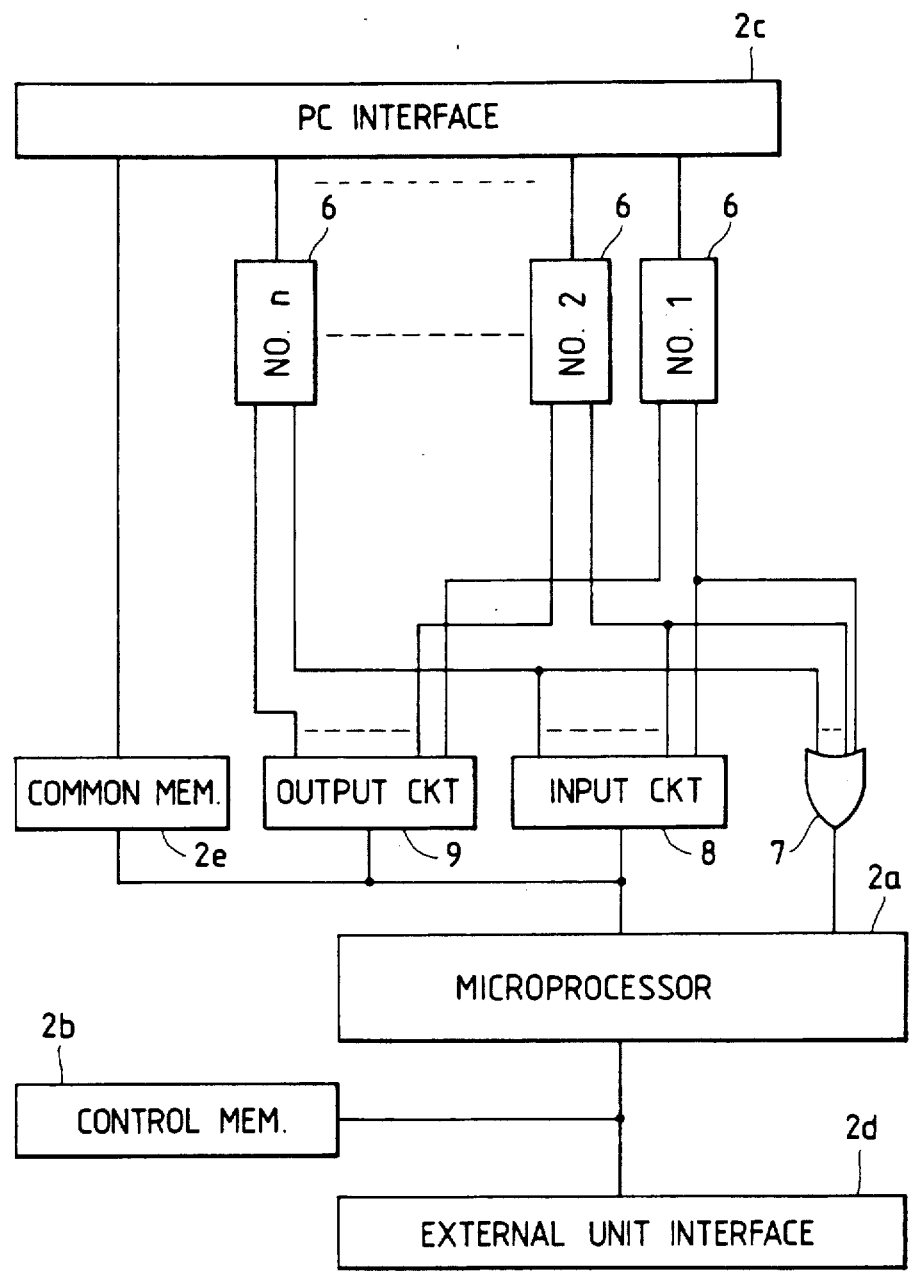
FIG. 1 is a block diagram showing the arrangement of one example of a special function unit for a programmable controller according to this invention.

In one example of a special function unit according to the invention, as shown in FIG. 1, an output signal received through a PC interface 2c is latched by latching means, namely, PC output signal latching flip-flop circuits 6, the outputs of which are applied through interruption input means, namely, an OR circuit 7, as interruptions, to a microprocessor 2a. In response to each of the interruptions, the microprocessor 2a determines it from output data of an input circuit 8 which of the output signals has been received and carried out various processing operations, thus control an external unit 5 through an external unit interface 2d. At the end of the interruption process, an output circuit 9 provides a reset control signal to reset the flip-flop circuit 6. For instance in the case of a positioning unit, the plurality of flip-flop circuits 6 are used for interruption of start, original point return, and speed change instructions. A forcible interruption and a process through the common memory are discriminated according to the necessity of response. When it is necessary to provide data for the process, the data is set in the common memory before a forcible interruption instruction is issued, and then the instruction is outputted.

The operation of the special function unit 2 thus organized will be described with reference to FIG. 2.

Figure 2:
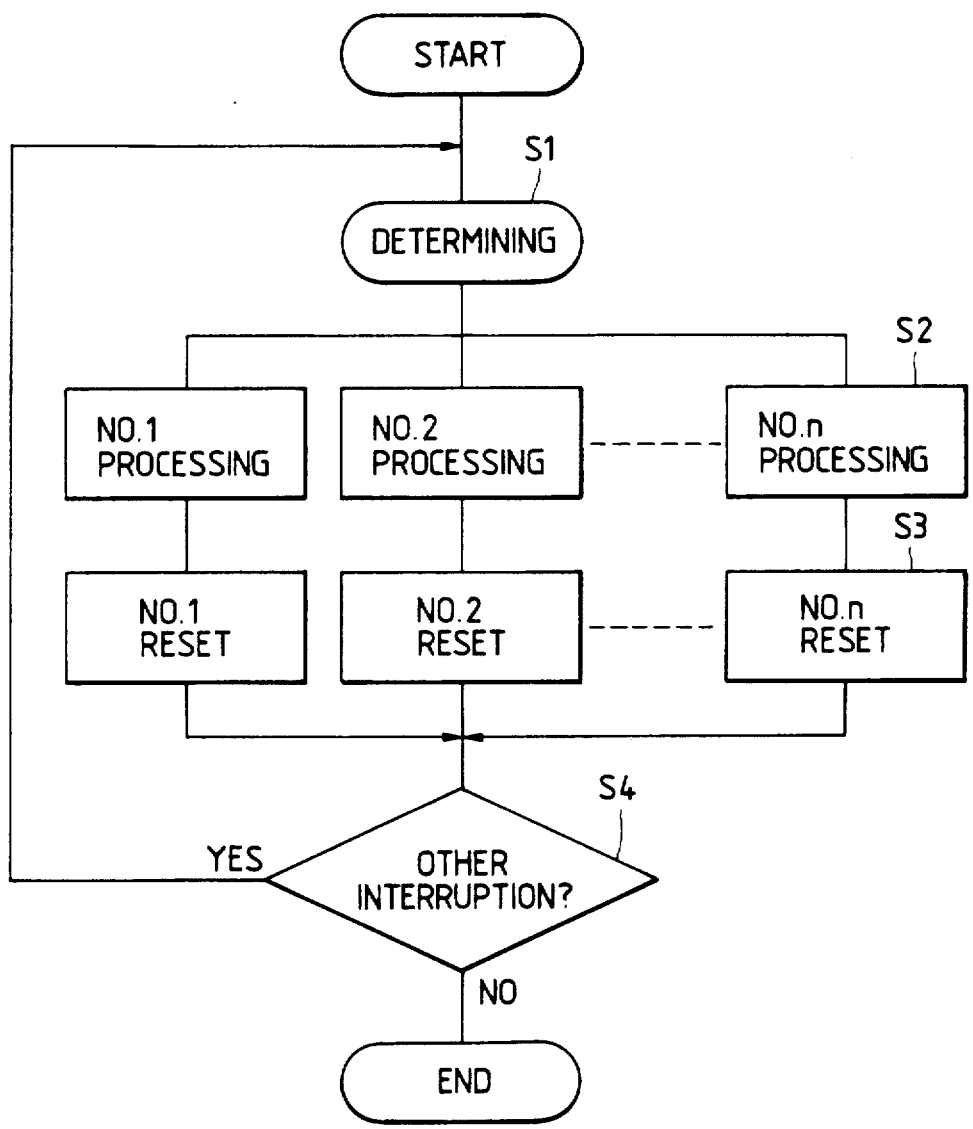
FIG. 2 is a flow chart for a description of the operation of the special function unit shown in FIG. 1.
Figure 3:
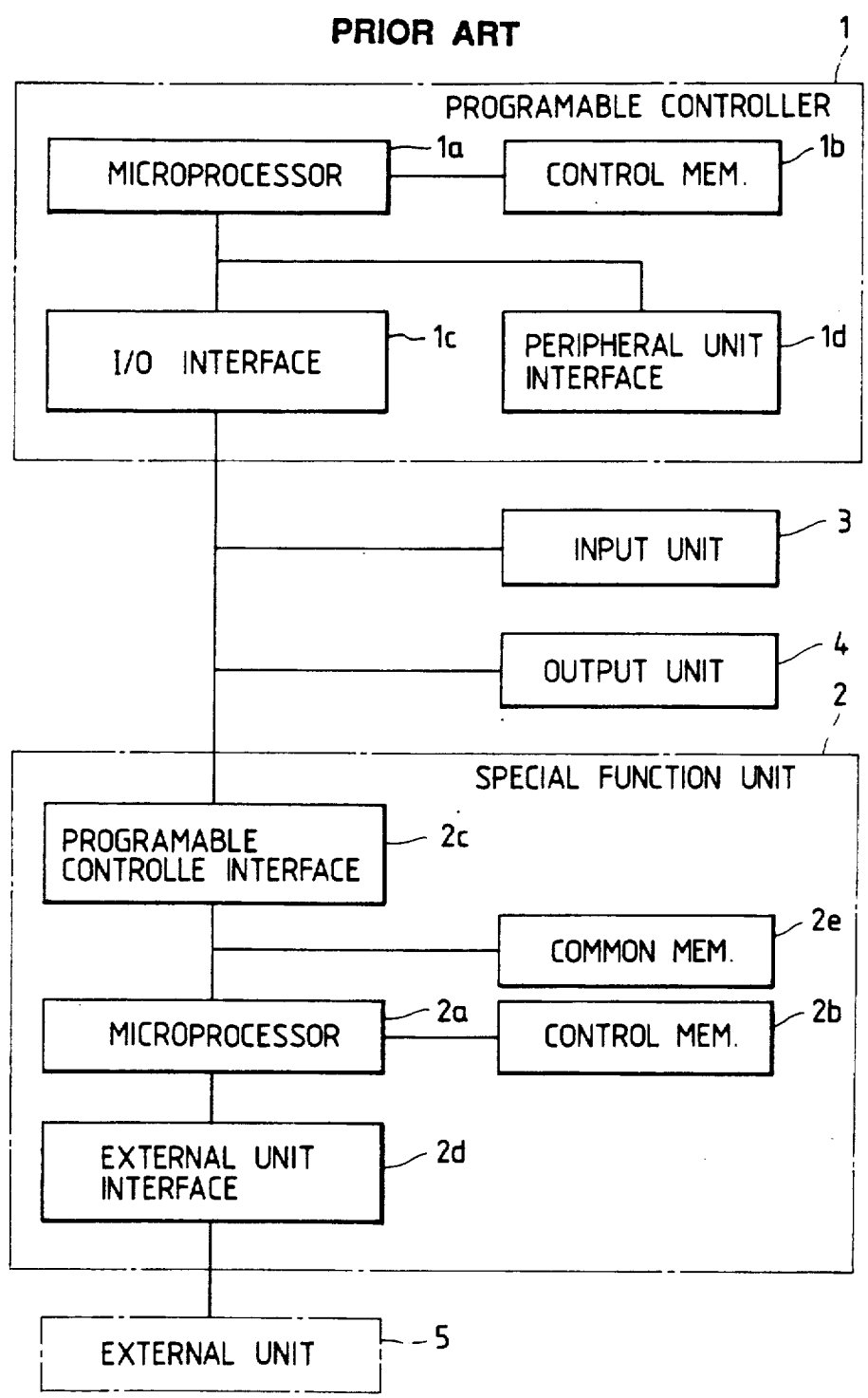
FIG. 3 is a block diagram showing a conventional special function unit for a programmable controller.

When the PC 1 provides an output signal, an interruption occurs, and an interruption routine in FIG. 2 is activated. At the beginning of the interruption routine, in step S1 it is determined what factor results in an interruption, and according to the factor thus determined the corresponding processing operation is selected. In step S2, the processing operation thus selected is carried out, to operate the external unit 5. Upon completion of the processing operation, an interruption factor resetting operation is carried out (Step S3). A plurality of interruptions may occur at the same time, or during the routine another interruption may occur. Therefore, in step S4 it is determined whether or not any interruption is still available. When an interruption is available, step S1 is effected again, and the corresponding processing operation is carried out. If, in this case, the interruptions are prioritized, then they may be handled beginning with the one highest in the order of priority. When all the factors have been eliminated, the routine is ended.

In the above-described embodiment, an interruption to the special function unit 2 is made by the PC 1. However, the special function unit 2 may have the function that, when necessary, masking an interruption can be carried out so that no interruption takes place when the special function unit is carrying out an urgent processing operation. In this case, control can be achieved most finely and suitably as the case may be.

As was described above, the special function unit according to the invention has the means for allowing an interruption to occur in response to the output signal of the programmable controller, and the means for discriminating interruption factors. Therefore, the special function unit of the invention is high in response speed, and uniform in processing operation.

While there has been described in connection with the preferred embodiment of the invention, it will be obvious to those skilled in the art that various changes and modifications may be made therein without departing from the invention, and it is aimed, therefore to cover in the appended claim all such changes and modifications as fall within the true spirit and scope of the invention.

What is claimed is:

1. A special function unit for a programmable controller, which controls external equipments in response to at least one controller output signal from said programmable controller, said special function unit comprising:
   plural flip-flop means, each for latching a respective one of said controller output signals from said programmable controller and providing a respective latch output signal;
   OR circuit means for generating an interruption input signal in response to each of said latch output signals from said flip-flop means;
   an input circuit for distinquishing among said controller output signals latched in said flip-flop means;
   an output circuit for resetting said flip-flop means;
   a microprocessor for performing an interruption processing according to said interruption input signal and an output of said input circuit in order to control said external equipments through an external equipment interface, and after the interruption processing, said microprocessor generating a reset control signal to said output circuit to reset said flip-flop means.

2. A special function unit as claimed in claim 1 further comprising:
   a common memory for storing processing data for interruption processing said microprocessor being operative to periodically sample said processing data stored in said common memory and to issue an interruption instruction to control said external equipment.

3. A special function unit as claimed in claim 1 wherein a plurality of factors may result in an interruption and said microprocessor determines what factor results in an interruption and selects a processing operation according to the determined factor.

4. A special function unit as claimed in claim 1 further comprising:
   a control memory corrected to said microprocessor for storing data representing an order of priority of interruptions, and wherein said microprocessor performs said interruption processing according to the order or priority.

5. A special function unit as claimed in claim 1 further comprising:
   a control memory for storing data for masking the interruption processing; and wherein said microprocessor masks the interruption processing according to the stored data when said special function unit is carrying out an urgent processing operation.

* * * * *